(12) United States Patent
Salzer, III et al.

(10) Patent No.: US 7,658,243 B1
(45) Date of Patent: Feb. 9, 2010

(54) SYSTEM AND METHOD FOR PREVENTING SLIPPAGE AND ROTATION OF COMPONENTS IN A TUBULAR HOUSING

(76) Inventors: John A. Salzer, III, 6018 Charrington Dr., Spring, TX (US) 77389; Michael Louis David, 102 N. Westdwinds Cir., The Woodlands, TX (US) 77382; Douglas Dewayne Eggleston, 3006 Peerless Pass Ct., Spring, TX (US) 77373; Paul Freeman Noe, 4403 Crimson Ct., Sugar Land, TX (US) 77479

( * ) Notice: Subject to any disclaimer, the term of this patent is extended or adjusted under 35 U.S.C. 154(b) by 0 days.

(21) Appl. No.: 12/291,963

(22) Filed: Nov. 14, 2008

(51) Int. Cl.
  *E21B 7/24* (2006.01)
(52) U.S. Cl. .................... 175/57; 175/107; 175/320
(58) Field of Classification Search ............... 175/320, 175/101, 107; 464/45, 46, 47, 18; 285/282, 285/280; 173/105, 108, 1, 28
  See application file for complete search history.

(56) References Cited

U.S. PATENT DOCUMENTS

| | | | | |
|---|---|---|---|---|
| 1,708,378 | A | * | 4/1929 | Dale .......................... 464/18 |
| 2,507,849 | A | * | 5/1950 | Bland .......................... 285/281 |
| 6,416,225 | B1 | * | 7/2002 | Cioceanu et al. .............. 384/97 |

* cited by examiner

*Primary Examiner*—Jennifer H Gay
*Assistant Examiner*—James G Sayre
(74) *Attorney, Agent, or Firm*—Matthews, Lawson & Bowick PLLC

(57) ABSTRACT

Systems and methods for preventing slippage and rotation of components installed in a tubular housing member and/or along a rotatable tubular shaft during drilling operations are disclosed herein. The housing and/or rotatable shaft include a shoulder disposed proximate to one end. An adjustable member is secured proximate to the opposite end. One or more components are installed, covering a first portion of the surface between the adjustable member and shoulder. One or more spacing members are installed to cover substantially all of the remaining surface. The adjustable member is tightened such that the adjustable member and the shoulder apply a compressive axial load to the components and spacing members, causing frictional forces between adjacent objects greater than the torque acting on the housing and/or tubular shaft, causing each component to remain stationary with respect to the surface to which it is secured.

24 Claims, 18 Drawing Sheets

SYSTEM AND METHOD FOR PREVENTING SLIPPAGE AND ROTATION OF COMPONENTS IN A TUBULAR HOUSING

FIELD

The embodiments herein relate generally to systems and methods for securing components within a tubular housing member for use with mud lubricated downhole drilling motors.

BACKGROUND

During downhole drilling operations, various bearing assemblies are used to provide support to portions of the drill string or to other components, and to provide thrust or asymmetrical moments to the drill string to orient or maintain the orientation of the drill bit.

It is a common problem in the art for various components secured within these assemblies to slip or rotate undesirably as the drill string and mud motor rotate, mitigating the effectiveness of the bearing assembly and requiring frequent removal and repair or replacement of the assembly, causing expensive downtime during drilling operations.

Typically, bearing assembly components are secured within a circular housing set screws, various types of locking pins and rings, keys and keyways, clamps, press fits, shrink fits, adhesives, shapes, splines, and similar locking means. These conventional securing measures create highly stressed areas within the assembly, known as stress risers, which are prone to increase wear and risk of damage and failure of the assembly during use.

Further, conventional securing measures typically require special shaping of the bearing assembly and installed components, which increases manufacturing costs.

Additionally, conventional securing methods often require precisely machined components, resulting in high manufacturing and installation costs, and a limited ability to remove, replace, or secure the components under high torque loads.

In many situations, conventional securing members, such as locking pins, keys, and set screws, experience heavy wear, can fail during use, and can require frequent repair or replacement. Conventional securing methods can also increase the wear and reduce the life expectancy of the bearing assembly housing, and components within the housing. Additionally, conventional securing means are often unable to adequately secure components within the housing under adverse or high torque situations.

A need exists for an improved method for securing components within a tubular housing compression to create frictional forces between adjacent objects that exceed the torque expected to act on the housing, without requiring conventional securing members, thereby reducing or eliminating the stressed areas present in a conventional assembly.

A further need exists for a method and system for securing components that are usable in high torque situations, without experiencing upsets or reducing the life expectancy of the housing or components.

A need also exists for a method and system usable to secure components to a stationary tubular housing member or to a rotatable tubular shaft within the housing, for selectively enabling certain components to rotate concurrent with the tubular shaft while maintaining other components in a stationary orientation concurrent with the tubular housing member.

The present embodiments meet these needs.

SUMMARY

In one embodiment, the present invention relates to a system for preventing slippage and rotation of components installed in a tubular housing, during drilling operations.

The system includes a tubular housing member in communication with a drill bit, the tubular housing member having an interior surface, a first end, and a second end configured for attachment to a mud motor. The mud motor can circulate drilling mud through the tubular housing member, to provide lubrication to the system components and to cool the system components. An interior shoulder, which can be integral with the tubular housing member, is disposed on the interior surface of the housing, proximate to the second end.

An adjustable member is secured to the tubular housing member opposite the interior shoulder, proximate to the first end. The adjustable member can include a threaded nut for engaging a threaded portion of the tubular housing member, or other types of adjustable members. Usable adjustable members can include a lock nut, a load nut, or similar retaining nuts, rings, fasteners, or other adjustable members.

At least one component is installed in the tubular housing member along the interior surface, between the shoulder and the adjustable member. The one or more components cover a first portion of the interior surface while leaving a second portion of the interior surface uncovered.

The components can include thrust bearings, upper and lower radial bearings, or similar types of components for providing support to one or more portions of the drill string or for providing orientation to the drill bit.

One or more spacing members can be disposed between the shoulder and the adjustable member, and/or between adjacent components, such that the spacing members cover substantially all of the second, uncovered portion of the interior surface. Spacing members can include split rings, spacers, retainers, washers, springs, including pre-loading and high load Belleville springs and/or wave springs, seals, such as O-rings, and similar items.

In an embodiment, one or more thrust bearings can be disposed in the tubular housing member between components and/or spacing members, such as between upper and lower radial bearings. The thrust bearings can have one or more lugs or ears, which engage slots of adjacent spacing members for preventing rotation of the thrust bearings. The thrust bearings can be pre-loaded using springs or other similar biasing members to facilitate abutment with adjacent objects while enabling axial movement of the thrust bearing as forces within the assembly change. Pre-loading of the thrust bearings can include up to 6,000 pounds of axial load, or more.

The adjustable member is torqued such that the adjustable member and shoulder apply a compressive axial load to each component and spacing member disposed along the interior surface of the tubular housing member. The compressive axial load creates frictional forces between opposing faces of the components and spacing members that is greater than the maximum torque expected to act on the tubular housing member.

Each component with the tubular housing member thereby remains stationary with respect to the housing during drilling operations, prolonging the life of the housing and the components, and enabling the components to provide support and/or orienting capabilities to the assembly.

The present embodiments further relate to a method for preventing slippage and rotation of components installed in a tubular housing member, as described above.

At least one component is installed in a tubular housing member, such that the one or more components cover a first portion of the interior surface of the housing member while leaving a second portion uncovered. At least one spacing member is installed in the tubular housing member such that the one or more spacing members cover substantially all of the second portion of the interior surface.

A torquable member is installed in the tubular housing member, and the torquable member is tightened to provide a compressive axial load to the components and spacing members, as described previously, thereby creating frictional forces between adjacent items greater than the maximum torque expected to act on the housing.

In a further embodiment, the present system is usable to simultaneously secure certain components to a tubular housing member, and certain other components to a rotatable tubular shaft installed within the tubular housing member, thereby enabling components secured to the tubular shaft to rotate concurrent with the shaft while components secured to the housing remain stationary when the shaft and its concurrent components rotate. During drilling operations, a mud motor in communication with the system can circulate drilling mud through the tubular housing member and along the tubular shaft, to provide lubrication and coolant to all system components, including bearings, and to enable rotation of the tubular shaft.

The system includes a tubular shaft, having an exterior surface, an upper end configured for attachment to a mud motor, a lower end configured for attachment to a drill bit, and a shaft shoulder disposed on the exterior surface proximate to the lower end. The tubular shaft is adapted to rotate during drilling operations through its connection to the mud motor.

A first adjustable member is secured to the tubular shaft opposite the shaft shoulder, proximate to the upper end. At least one rotating component is installed between the shaft shoulder and the first adjustable member, such that the rotating components cover a first portion of the exterior surface, leaving a second portion of the exterior surface uncovered. At least one shaft spacing member is installed on the exterior surface covering substantially all of the second portion of the exterior surface.

A tubular housing member is disposed over the tubular shaft, the tubular housing member having an inner surface, a first end, a second end configured for attachment to the mud motor, and a housing shoulder proximate to the second end. The tubular housing member is adapted to remain stationary with respect to a fixed point, while the tubular shaft rotates during drilling operations.

A second adjustable member is secured to the interior surface of the tubular housing member opposite the housing shoulder, proximate to the first end. At least one stationary component is installed along the inner surface covering a first portion of the interior surface while a second portion of the interior surface remains uncovered. At least one housing spacing member is installed along the interior surface such that substantially all of the second portion of the interior surface is covered.

The first adjustable member is tightened to apply a compressive axial force along the rotating components and shaft spacing members, creating frictional forces that exceed the expected maximum torque acting on the tubular shaft. The second adjustable member is tightened to apply a compressive axial force along the stationary components and housing spacing members, creating frictional forces that exceed the expected maximum torque acting on the tubular housing member.

During drilling operations, all of the components secured to both the tubular housing member and to the tubular shaft remain stationary with respect to the surface to which the components are secured, without slipping or rotating undesirably, and without use of conventional securing members that can cause highly stressed areas, upsets, or reduce the life of the assembly or components. Components secured to the tubular shaft rotate concurrent with the rotation of the tubular shaft during drilling operations, while components secured to the tubular housing member remain stationary during drilling operations.

The configuration of the bearing assembly enables the bearing assembly to experience extremely low wear and low repair costs. Stationary thrust bearings can be pre-loaded with up to 6,000 pounds, or more, of axial load using springs, which cause the stationary thrust bearings to abut against adjacent rotating thrust bearings. Both stationary and rotating thrust bearings can include plates on the opposing faces of the bearings, the plates at least partially composed of man-made or synthetic diamonds to extend the life of the thrust bearings.

Further, stationary and rotating radial bearings compressed within the assembly can include tungsten carbide inserts or bushings that are shrunk fit and disposed between stationary and rotating radial bearings to prevent wear on the bearings. Should the bushings become worn, they can be removed, and the bearing housing can be rotated 180 degrees prior to re-insertion of the bushings, to extend the useful life of the bushings. Additionally, the bushings can be interchangeable, such that a bushing can be used between upper stationary and rotating radial bearings, then removed and used between lower stationary and rotating radial bearings.

As a result, the useful life of the bearing assembly is extended. Further, repair costs for the present bearing assembly can be as low as four dollars per hour of use, while typical repair costs for a conventional assembly can exceed thirty dollars per hour of use. Additionally, replacement costs for an individual bushing can be as low as three hundred dollars, or less, while replacement of one or more bearings or a larger portion of the assembly can cost thousands of dollars.

Further, the present bearing assembly is simple in design, and is able to be assembled and disassembled in as little as one to two hours, while a conventional bearing assembly can require eight hours or longer to assemble or disassemble.

BRIEF DESCRIPTION OF THE DRAWINGS

In the detailed description of the embodiments presented below, reference is made to the accompanying drawings, in which.

The present embodiments are detailed below with reference to the listed Figures.

DETAILED DESCRIPTION OF THE EMBODIMENTS

Before explaining the present embodiments in detail, it is to be understood that the embodiments are not limited to the particular descriptions and that the embodiments can be practiced or carried out in various ways.

Figure 1:
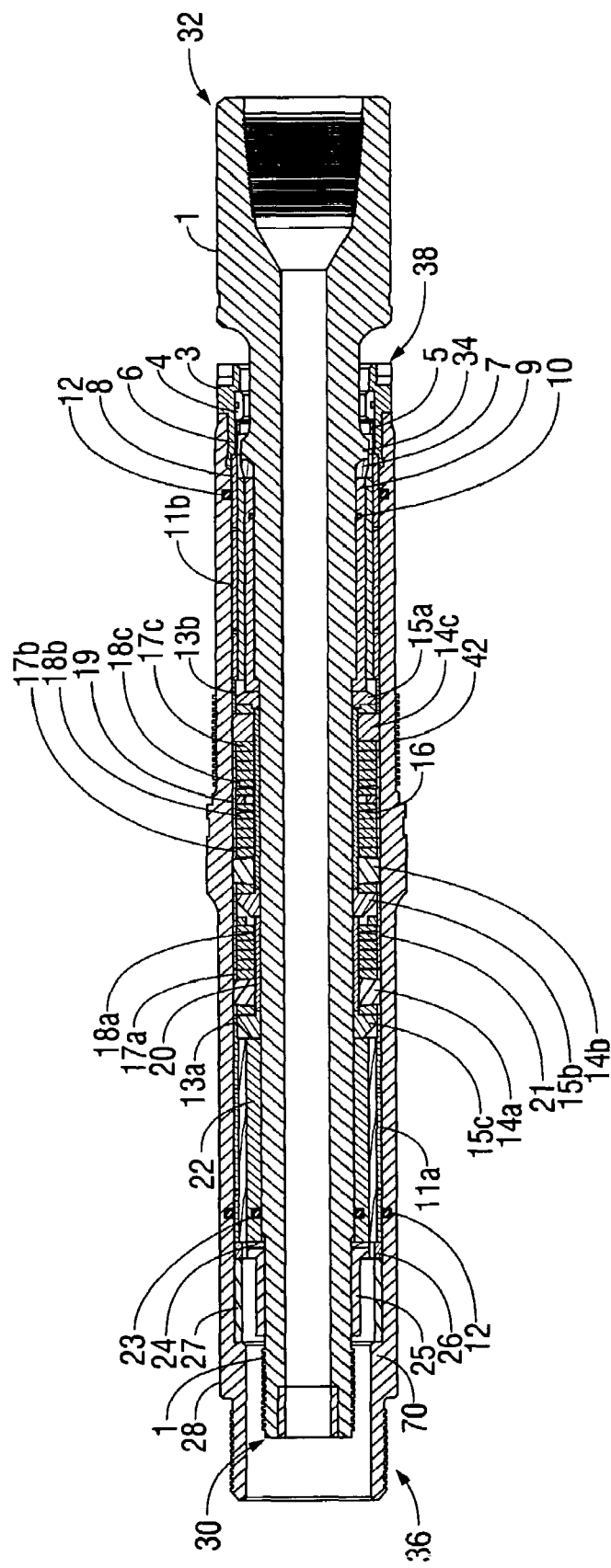
FIG. 1 depicts a cross-section of an embodiment of the present system.

Referring now to FIG. 1, a cross-sectional view of an embodiment of the present system is shown.

FIG. 1 depicts a tubular drive shaft (1) installed within a tubular housing member (28). The tubular drive shaft (1) is shown having an upper end (30) configured for attachment to a mud motor via a male threaded portion, and a lower end (32) configured for attachment to a drill bit via a female threaded portion. The upper end (30) is shown having an interior erosion sleeve.

While the dimensions of the tubular drive shaft (1), tubular housing member (28), and any other system parts or components can be varied depending on the size and purpose of an attached drill string, mud motor, drill bit, or other drilling component, in an embodiment, the tubular drive shaft (1) can have an overall length of approximately 52.85 inches, an outer diameter ranging from 3.285 inches to 6.75 inches and an inner diameter of about 2.250 inches at the upper end (30), and an outer diameter of about 6.75 inches and an inner diameter of about 4.6875 inches at the lower end (32).

The tubular drive shaft (1) has an integral shaft shoulder (34) disposed proximate to the lower end (32). In an embodiment, the shaft shoulder (34) can have an outer diameter ranging from 0.75 inches to 1.0 inch greater than the adjacent portions of the tubular drive shaft (1).

The tubular housing member (28) has an upper end (36) configured for attachment to a mud motor via a threaded portion, and a lower end (38). The length and diameter of the tubular housing member (28) can be varied depending on the size of the tubular drive shaft (1). In an embodiment, the tubular housing member can have a length of approximately 42.89 inches, an outer diameter of approximately 6.75 inches at the lower end (38) and 5.360 inches at the upper end (36), and an inner diameter of about 6.10 inches at its lower end (38) and about 4.75 inches at its upper end.

The tubular housing member (28) is shown having an integral housing shoulder (70) disposed on its inner surface proximate to its upper end (36). The housing shoulder (70) can have a height of about 0.50 inches. The tubular housing member (28) is further shown having an exterior threaded portion (42), which can engage exterior components, such as one or more stabilizers.

Figure 2A:
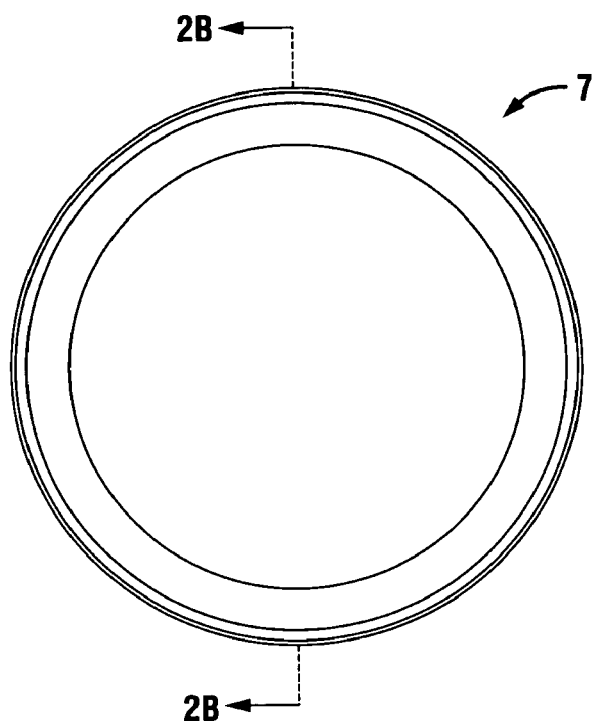
FIG. 2A depicts a front view of a bottom rotating spacer usable with the present system.
Figure 2B:
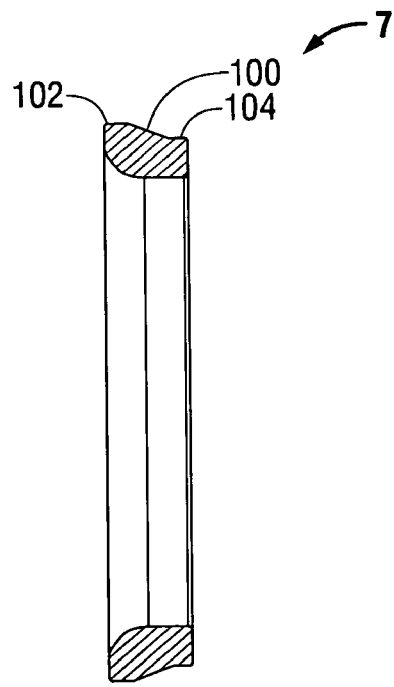
FIG. 2B depicts a cross-sectional view of the bottom rotating spacer of FIG. 2A along line 2B.

A bottom rotating spacer (7) is shown disposed along the exterior surface of the tubular drive shaft (1), abutting the shaft shoulder (34). FIGS. 2A and 2B depict an embodiment of the bottom rotating spacer (7), which can be a ring-like structure adapted to be installed over the tubular drive shaft (1). The depicted bottom rotating spacer (7) has a sloping outer surface (100) with a sloping angle of approximately 20 degrees, disposed between a first generally flat outer portion (102), providing an outer diameter of about 5.00 inches proximate to the shaft shoulder (34), and a second generally flat outer portion (104), providing an outer diameter of about 4.70 inches at the opposite end.

The length of the bottom rotating spacer (7) can be 0.750 inches, with the length of the first generally flat outer portion (102) being about 0.21 inches, the length of the sloping outer surface (100) being about 0.40 inches, and the length of the second generally flat outer portion (104) being about 0.14 inches. The inner diameter of the bottom rotating spacer (7) can be 4.010 inches. The inner surface of the bottom rotating spacer (7) can be generally flat toward the second generally flat outer portion (104), having a curvature toward the first generally flat outer portion (102).

Figure 3:
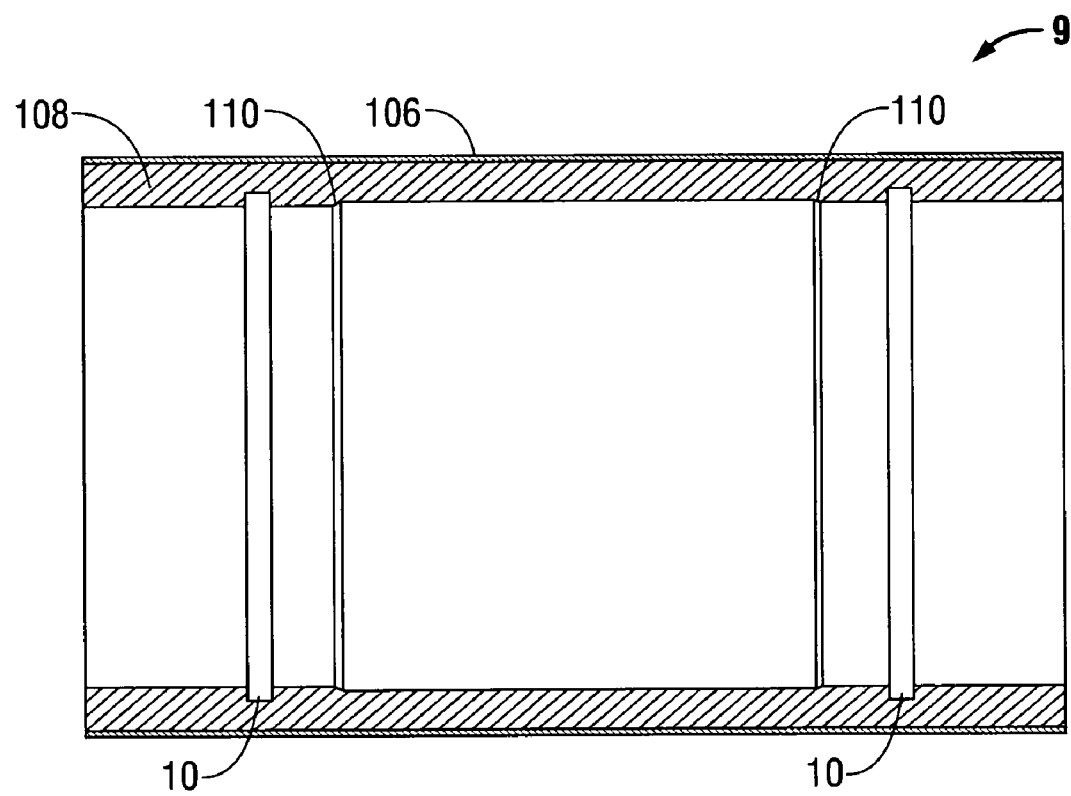
FIG. 3 depicts a cross-sectional view of a lower rotating bearing usable with the present system.

A lower rotating bearing (9) is depicted installed along the exterior surface of the tubular drive shaft (1) adjacent to the bottom rotating spacer (7). FIG. 3 depicts an embodiment of the lower rotating bearing (9), which is shown as a cylindrical component having a length ranging from 8.00 inches to 8.25 inches. The lower rotating bearing (9) can have a spherical tungsten carbide weld overlay (106), or similar coating, overlay, insert, or bushing, disposed over a cylindrical portion (108), providing an outer diameter of about 4.833 inches. The inner diameter of the lower rotating bearing (9) can range from about 4.003 inches toward either end to about 4.07 inches between two 30-degree interior shoulders (110) formed approximately 2.06 inches from either end of the lower rotating bearing (9).

One or more O-rings or other sealing members can be installed over the lower rotating bearing (9) in one or more O-ring grooves (10). The O-ring grooves (10) can have an outer diameter ranging from 4.222 to 4.224 inches and a width ranging from 0.187 to 0.192 inches, and can be disposed approximately 1.45 inches from each end of the lower rotating bearing (9).

FIG. 1 further depicts a plurality of rotating thrust bearings (15a, 15b, 15c) disposed along the exterior surface of the tubular drive shaft (1). The first rotating thrust bearing (15a) is disposed adjacent to and abuts the lower rotating bearing (9).

A long rotating spacer (16) is shown extending along the exterior surface of the tubular drive shaft (1), abutting against the first rotating thrust bearing (15a) on a first end and against the second rotating thrust bearing (15b) on a second end. A short rotating spacer (20) is shown extending along the interior surface of the tubular drive shaft (1), abutting against the second rotating thrust bearing (15b) on a first end and against the third rotating thrust bearing (15c) on a second end.

Figure 4A:
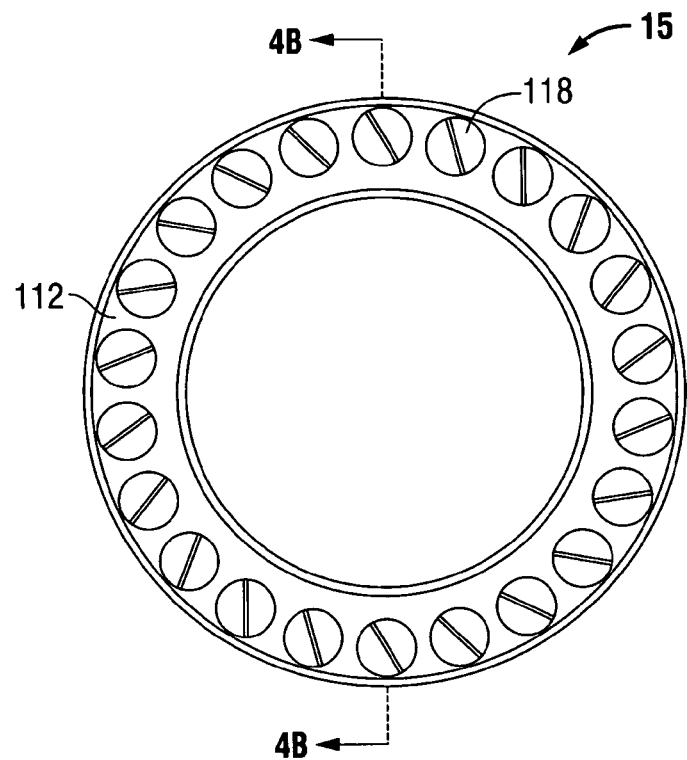
FIG. 4A depicts a front view of a rotating thrust bearing usable with the present system.
Figure 4B:
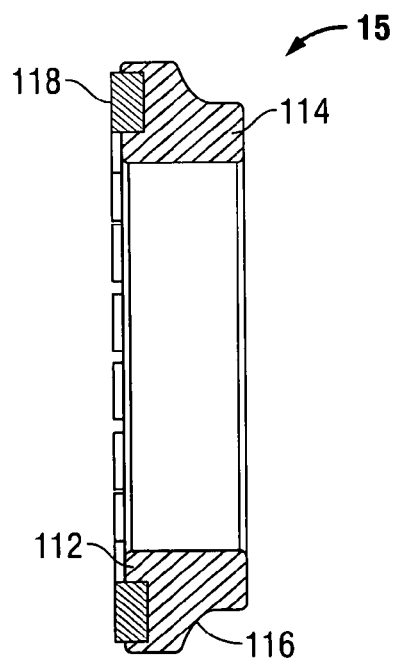
FIG. 4B depicts a cross-sectional view of the rotating thrust bearing of FIG. 4A along line 4B.

FIGS. 4A and 4B depict an embodiment of a rotating thrust bearing (15), which is shown as a ring-like structure having an inner diameter of about 3.610 inches. The rotating thrust bearing (15) can have an outer diameter of about 5.438 on a first end (112) and 4.700 on a second end (114), with an exterior 60-degree shoulder (116), relative to the first end (112), separating the first end (112) from the second end (114). FIGS. 4A and 4B depict twenty-two equally spaced, round plates (118) circumferentially disposed on the first end (112), each having a diameter of about 0.536 inches. The plates can be at least partially formed from diamond, such as polycrystalline diamond compact, or a similar material, for preventing wear on the rotating thrust bearing (15). The total width of the depicted rotating thrust bearing (15) can be 1.225 inches including the protruding thickness of the plates (118), or 1.13 inches excluding the thickness of the plates (118). Each plate can be embedded into the first end (112) of the rotating thrust bearing (15), extending from 0.16 to 0.315 inches into the first end (112). Each plate can protrude from 0.055 inches to 0.095 inches from the first end (112) for contacting adjacent components.

Figure 5A:
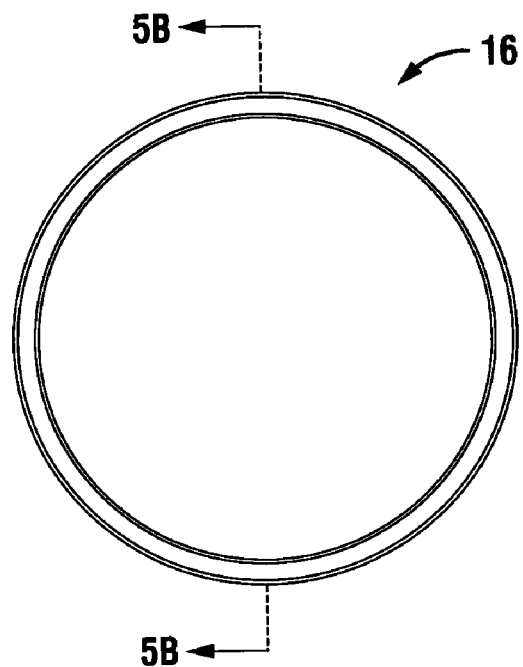
FIG. 5A depicts a front view of a long rotating spacer usable with the present system.
Figure 5B:
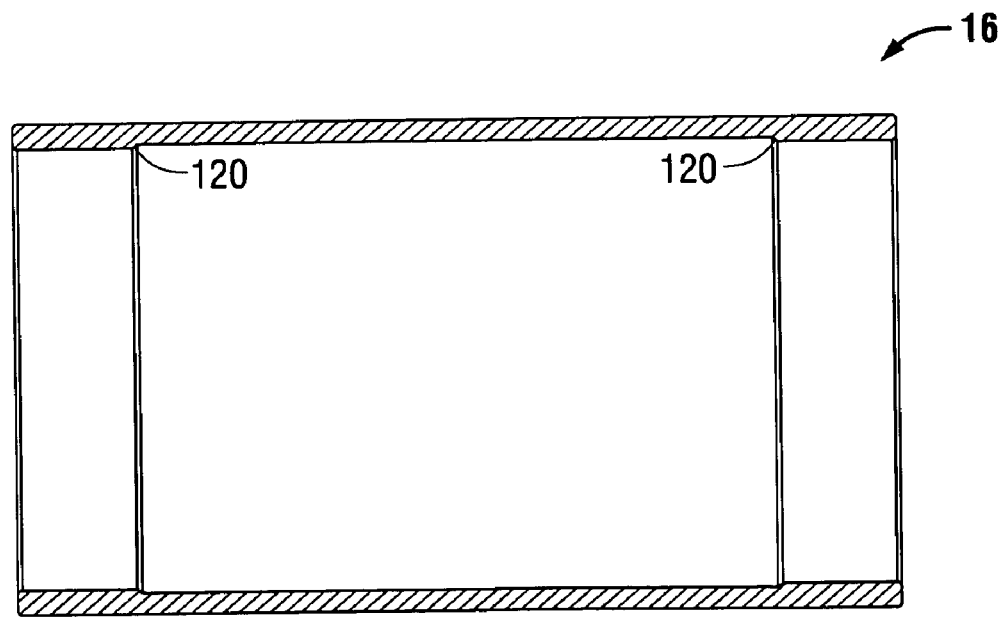
FIG. 5B depicts a cross-sectional view of the long rotating spacer of FIG. 5A along line 5B.

FIGS. 5A and 5B depict an embodiment of the long rotating spacer (16), which is shown as a cylindrical structure having a length of about 7.10 inches, and an outer diameter of about 4.000 inches. The inner diameter of the long rotating spacer (16) can range from about 3.610 inches at either end to about 3.67 inches along a portion of the interior surface disposed between two 45-degree interior shoulders (120) formed approximately 1.00 inch from either end of the long rotating spacer (16).

Figure 6A:
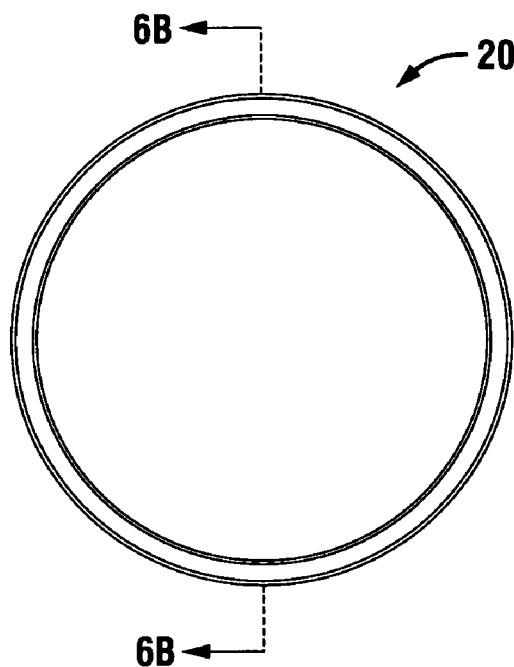
FIG. 6A depicts a front view of a short rotating spacer usable with the present system.
Figure 6B:
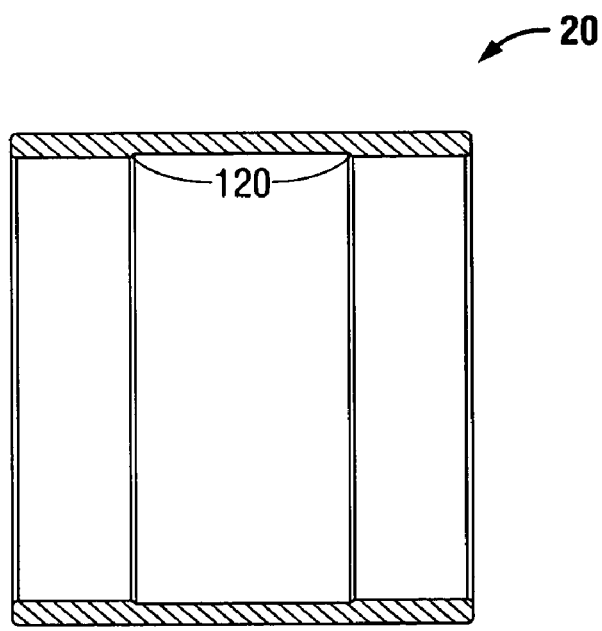
FIG. 6B depicts a cross-sectional view of the short rotating spacer of FIG. 6A along line 6B.

FIGS. 6A and 6B depict an embodiment of the short rotating spacer (20), which can be a cylindrical structure having an outer diameter and inner diameter substantially similar to that of the long rotating spacer (16), having interior 45-degree shoulders (120) formed approximately 1.00 inch from either end. The length of the short rotating spacer (20) can be approximately 3.745 inches.

FIG. 1 further depicts an upper rotating bearing (22) disposed along the exterior surface of the tubular drive shaft (1) adjacent to and abutting the third rotating thrust bearing (15c).

Figure 7:
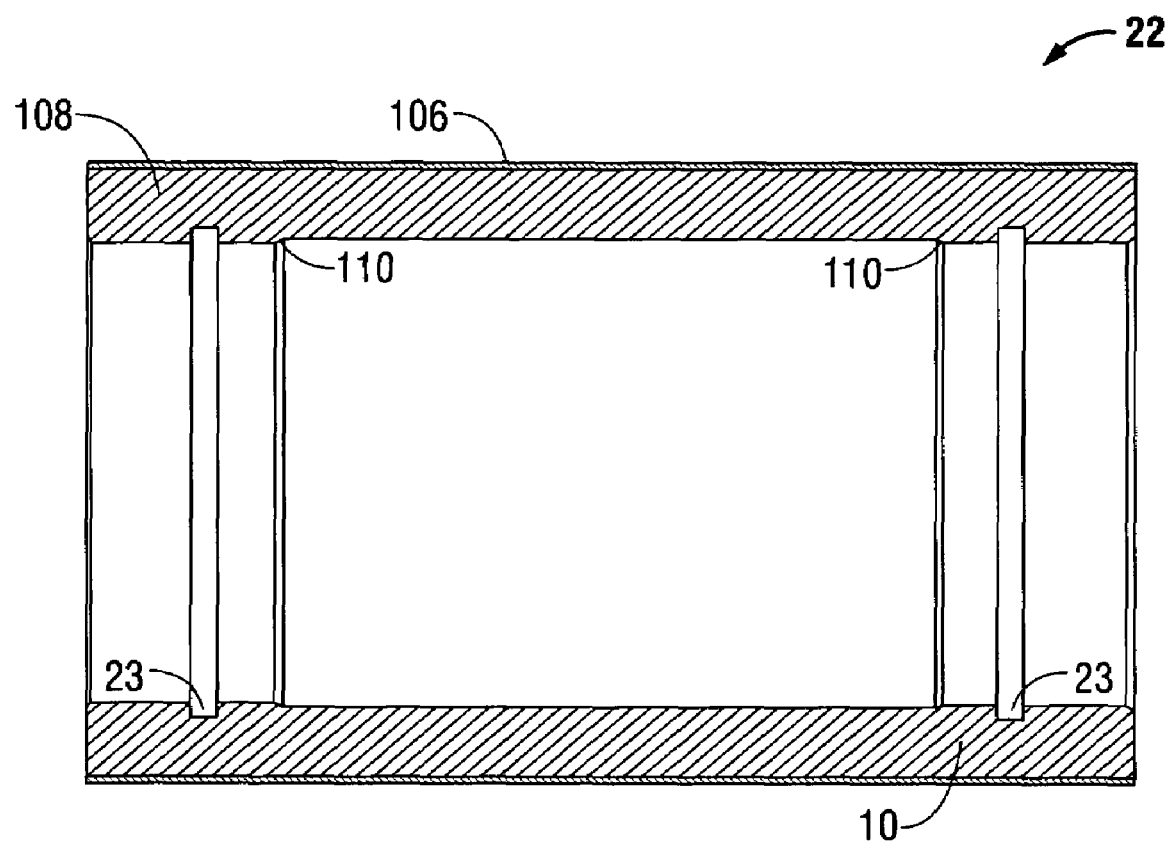
FIG. 7 depicts a cross-sectional view of an upper rotating bearing usable with the present system.

FIG. 7 depicts an embodiment of the upper rotating bearing (22), which is shown as a cylindrical structure with a spherical tungsten carbide weld overlay (106), or similar coating, disposed over a cylindrical portion (108), having an overall length of about 8.00 inches, and an outer diameter of about 4.833 inches. The inner diameter of the upper rotating bearing (22) can range from about 3.605 at either end, to about 3.68 at a portion of the interior surface disposed between two interior shoulders (110). The interior shoulders (110) can be formed approximately 1.50 inches from either end of the upper rotating bearing (22).

One or more O-rings or other sealing members can be installed over the upper rotating bearing (22) in one or more O-ring grooves (23). In an embodiment, the O-ring grooves (23) can have a width ranging from 0.187 to 0.192 inches and an inner diameter ranging from 3.828 to 3.830 inches. The O-rings can be installed approximately 1.00 inch from either end of the upper rotating bearing (22).

A load nut (25) is depicted threadably installed along the exterior surface of the tubular drive shaft (1), abutting against a thrust washer (24) disposed between the load nut (25) and the upper rotating bearing (22). In an embodiment, the thrust washer (24) can be a ring-like structure adapted to be installed over the tubular drive shaft (1), having an inner diameter of about 3.715 inches, an outer diameter of about 4.70 inches, and a width of about 0.25 inches.

Figure 8A:
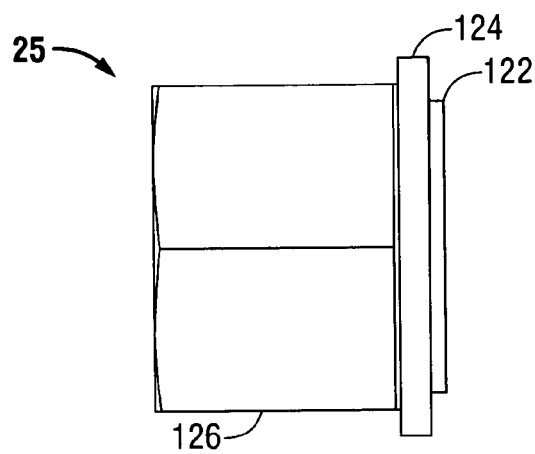
FIG. 8A depicts a side view of a load nut usable with the present system.
Figure 8B:
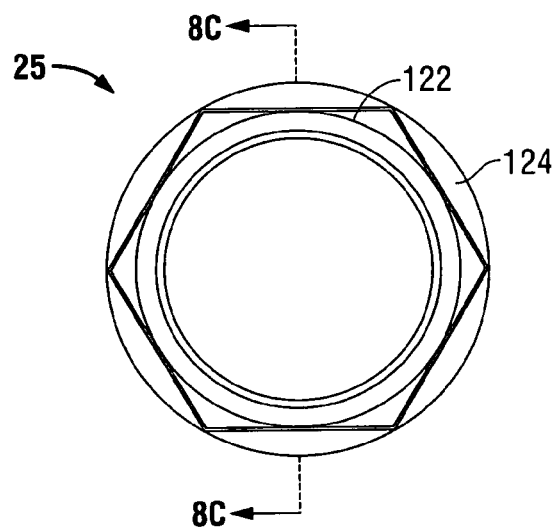
FIG. 8B depicts a front view of the load nut of FIG. 8A.
Figure 8C:
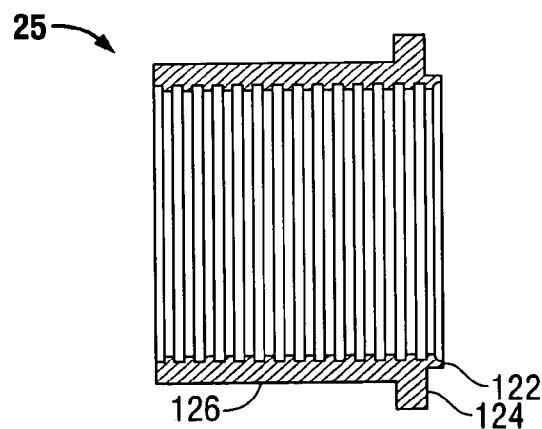
FIG. 8C depicts a cross-sectional view of the load nut of FIG. 8B along line 8C.

FIGS. 8A, 8B, and 8C depict an embodiment of the load nut (25), which can be a threaded hexagonal nut having a front round portion (122), a round shoulder (124), and a rear hexagonal portion (126), providing an overall length of about 3.56 inches. The front round portion (122) can have a length of about 0.187 inches, the round shoulder (124) can have a length of about 0.373 inches, and the rear hexagonal portion (126) can have a length of about 3.00 inches. The front round portion (122) can have a diameter of about 3.700 inches, the round shoulder (124) can have a diameter of about 4.70 inches, and the rear hexagonal portion (126) can have a length of 4.000 to 4.001 inches across the flats. The round shoulder (124) can provide increased surface area for abutting against adjacent components installed along the tubular drive shaft (1).

The load nut (25) is threadably engaged such that it does not loosen during drilling operations without manual adjustment, thereby securing the components of the present bearing assembly through compression, without requiring additional locking mechanisms for retaining the load nut (25).

When the load nut (25) is tightened, the upper rotating bearing (22), rotating thrust bearings (15a, 15b, 15c), long and short rotating spacers (16, 20), lower rotating bearing (9), and bottom rotating spacer (7) are compressed into the shaft shoulder (34). The resultant axial load is sufficient to create frictional forces between all of the components installed along the tubular drive shaft (1). The load applied using the load nut (25) and shaft shoulder (34) can be selected to create frictional forces greater than the maximum torque expected to be applied on the tubular drive shaft (1).

Each of the installed components is thereby retained in a stationary orientation with respect to the tubular drive shaft (1) using solely the compression between the load nut (25) and the shaft shoulder (34), such that all of the components installed along the tubular drive shaft (1) rotate concurrent with the rotation of the tubular drive shaft (1) during drilling operations.

FIG. 1 also depicts additional components installed along the interior surface of the tubular housing member (28) for securing the components in a stationary orientation with respect to the tubular housing member (28) during drilling operations, while the tubular drive shaft (1) and its current components rotate.

Figure 9A:
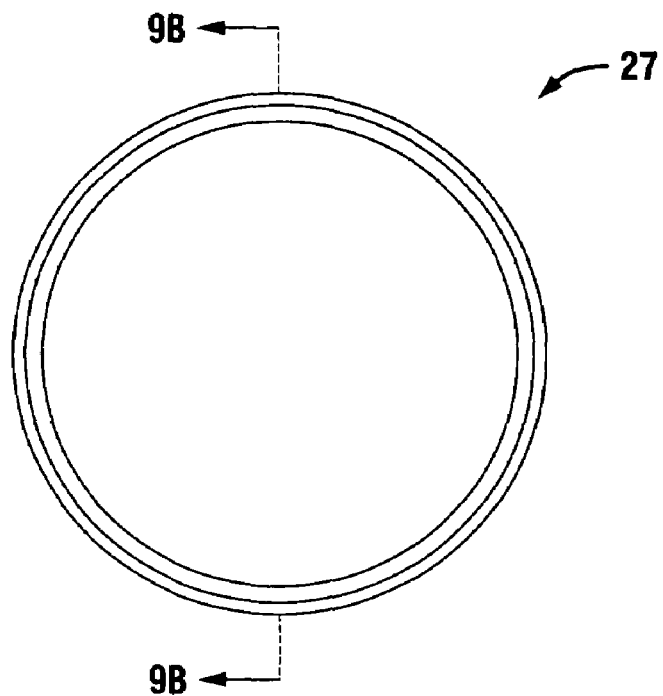
FIG. 9A depicts a front view of an upper stationary spacer usable with the present system.
Figure 9B:
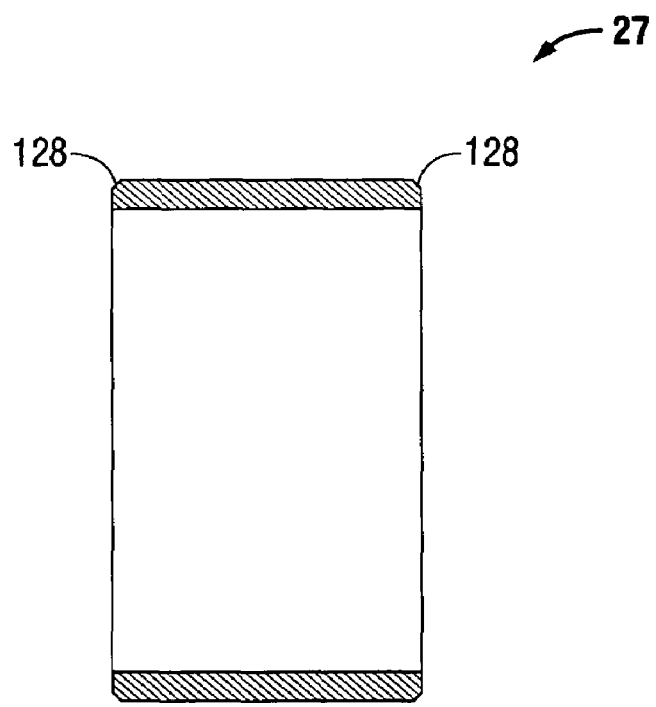
FIG. 9B depicts a cross-sectional view of the upper stationary spacer of FIG. 9A along line 9B.

FIG. 1 depicts an upper stationary spacer (27) disposed adjacent the housing shoulder (70) along the interior surface of the tubular housing member (28). FIGS. 9A and 9B depict an embodiment of the upper stationary spacer (27), which is shown as a cylindrical structure having a length of approximately 3.375 inches, an outer diameter of about 5.735 inches, and an inner diameter of about 5.13 inches. The upper stationary spacer (27) is shown having 45-degree external shoulders (128).

A stationary load spacer (26) is depicted along the interior surface of the tubular housing member (28) adjacent to the upper stationary spacer (27). In an embodiment, the stationary load spacer (26) can be a ring-like structure having a width ranging from 0.490 inches to 0.590 inches, an outer diameter of 5.735 inches, and an inner diameter of 5.13 inches.

Figure 10A:
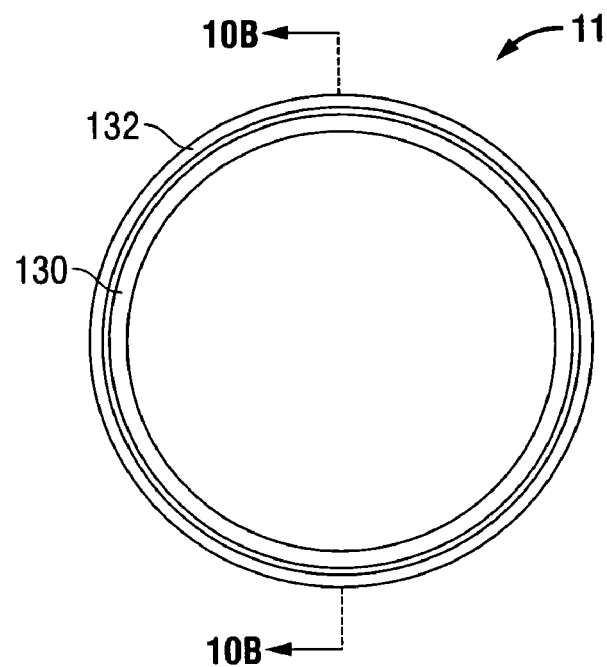
FIG. 10A depicts a front view of a stationary radial bearing usable with the present system.
Figure 10B:
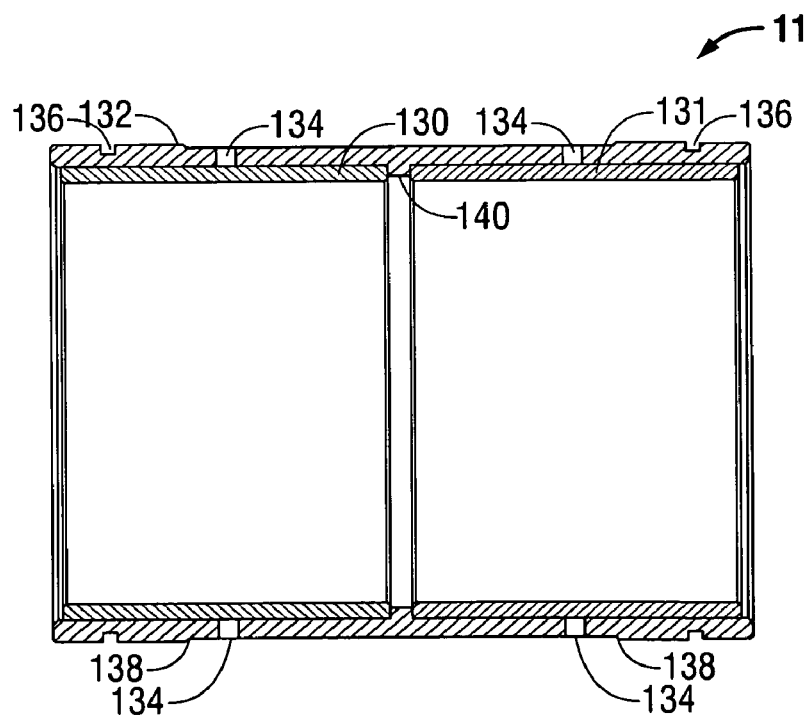
FIG. 10B depicts the stationary radial bearing of FIG. 10A along line 10B.

FIG. 1 also depicts an upper stationary radial bearing (11a) disposed adjacent the stationary load spacer (26) along the interior surface of the tubular housing member (28). FIGS. 10A and 10B depict an embodiment of a stationary radial bearing (11), having a bearing body (132) with a first carbide insert or bushing (130) disposed in a first end and a second carbide insert or bushing (131) disposed on the opposite end, having an overall length of about 8.000 inches. The exterior surface of the bearing body (132) can include one or more drill-through holes (134) disposed approximately 2.00 inches from either end of the stationary radial bearing (11). The exterior surface of the bearing body (132) can further include one or more grooves (136) for accommodating O-rings (12), disposed approximately 0.75 inches from either end of the stationary radial bearing (11). The grooves (136) can range from about 0.187 to 0.192 inches in width and can have a depth of approximately 0.105 inches.

The outer diameter of the stationary radial bearing (11) can be about 5.735 inches at either end, ranging to about 5.68 inches along a portion of the exterior surface disposed between two 30-degree exterior shoulders (138). The inner diameter of the bearing body (132) can range from 5.2500 to 5.2516 inches. The inner surface of the bearing body (132) is shown including a central ridge (140) having a width of about 0.125 inches, against which each of the inserts or bushings (130, 131) abuts.

The tungsten carbide inserts or bushings (130, 131) are disposed between the upper stationary radial bearing (11a) and the upper rotating bearing (22), for preventing wear on the bearings. Each bushing assembly can be removed, inverted, and reinserted to prolong the useful life of the bearings and enable even wear of the bushings. Additionally, each bushing assembly can be removed, and interchanged with another bushing assembly within the bearing assembly. The interchangeability and ability to invert each bushing prolongs the life of the bearing assembly while minimizing repair and replacement costs. For example, replacement of a tungsten carbide bushing can cost approximately three hundred dollars, while replacement of multiple bearings or the tubular housing member (28) can cost over one thousand dollars.

An upper end stationary spacer (13a) is shown adjacent to and abutting the upper stationary radial bearing (11a), disposed along the interior surface of the tubular housing member (28).

A series of stationary thrust bearings (14a, 14b, 14c) are disposed along the exterior surface of the tubular housing member (28). The first stationary thrust bearing (14a) is disposed adjacent the upper end stationary spacer (13a) and the third rotating thrust bearing (15c).

A first group of preloading biasing members (17a) and a first group of high load biasing members (18a), which can include Belleville springs or similar biasing members, are disposed adjacent the first stationary thrust bearing (14a).

An upper retainer (21) is disposed external to the first groups of biasing members (17a, 18a) for both retaining the position of the biasing members (17a, 18a) and, in an embodiment, for engaging with a lug or ear of the first stationary thrust bearing (14a) via one or more slots.

The second stationary thrust bearing (14b) is disposed adjacent the upper retainer (21) and the second rotating thrust bearing (15b). A second group of preloading biasing members (17b) and a second group of high load biasing members (18b) are disposed adjacent the second stationary thrust bearing (14b).

A lower retainer (19) is disposed external to and adjacent to the second groups of biasing members (17b, 18b). A third group of preloading biasing members (17c) and a third group of high load biasing members (18c) are disposed adjacent to and internal to the lower retainer (19). A third stationary thrust bearing (14c) is disposed along the interior surface of the tubular housing member (28) adjacent the third groups of biasing members (17c, 18c) and the first rotating thrust bearing (15a). A lower end stationary spacer (13b) is shown adjacent to the third stationary thrust bearing (14c), disposed along the interior surface of the tubular housing member (28).

Figure 11A:
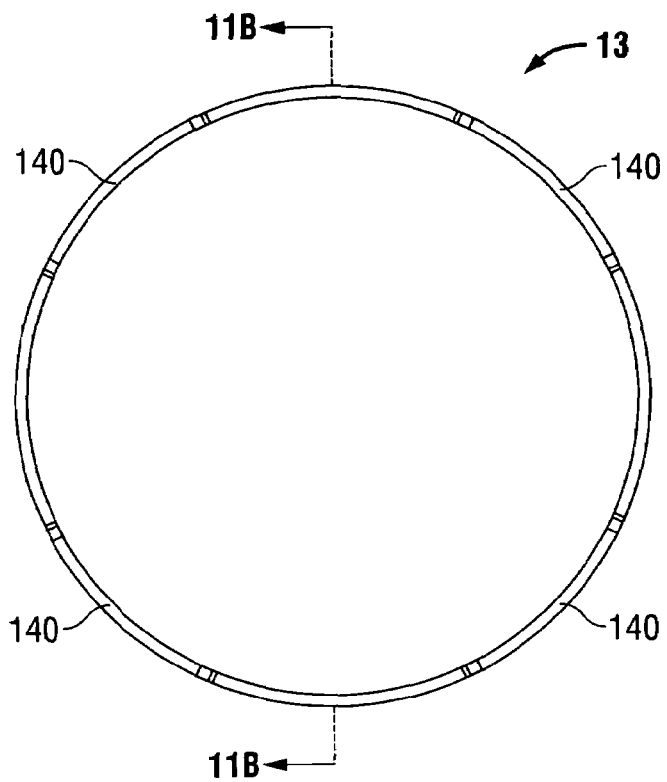
FIG. 11A depicts a front view of an end stationary spacer usable with the present system.
Figure 11B:
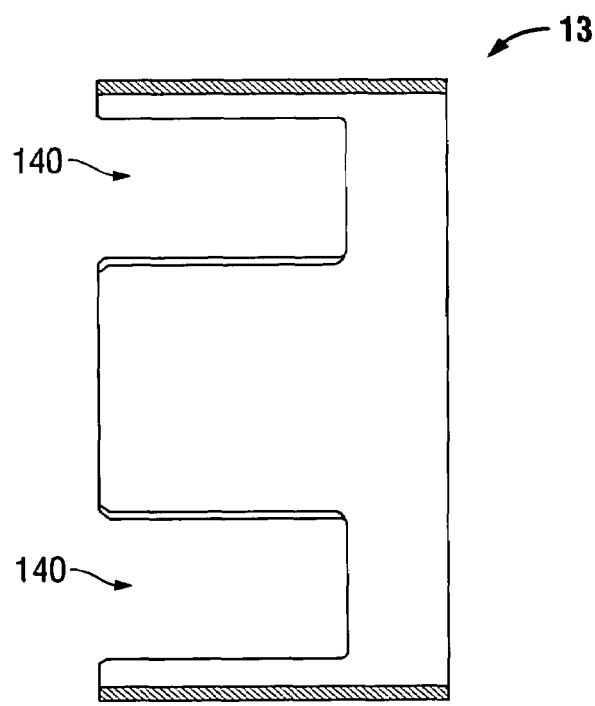
FIG. 11B depicts a cross-sectional view of the end stationary spacer of FIG. 11A along line 11B.

FIGS. 11A and 11B depict an embodiment of an end stationary spacer (13), which can be a cylindrical structure approximately 3.200 inches in length, having an outer diameter of about 5.735 inches and an inner diameter of about 5.49 inches. The end stationary spacer (13) can have one or more slots (140) approximately 2.25 inches in length, each having a width occupying approximately 11.39 percent (41 degrees) of the circumference of the end stationary spacer (13). The slots (140) can be usable to engage with lugs or ears protruding from the adjacent stationary thrust bearings to prevent slippage and rotation of the thrust bearings and to facilitate the maintenance of the thrust bearings in a stationary relationship with the tubular housing member (28).

When the end stationary spacer (13) abuts the adjacent upper retainer (21), the slots (140) abut against adjoining slots in the upper retainer (21), forming closed slots for retaining lugs or ears of the adjacent stationary thrust bearing. The stationary thrust bearings are thereby retained in an axial position using the load of the adjacent biasing members, while rotation of the stationary thrust bearings is prevented by engagement of the lugs or ears within slots of the adjacent spacers and/or retainers.

Figure 12A:
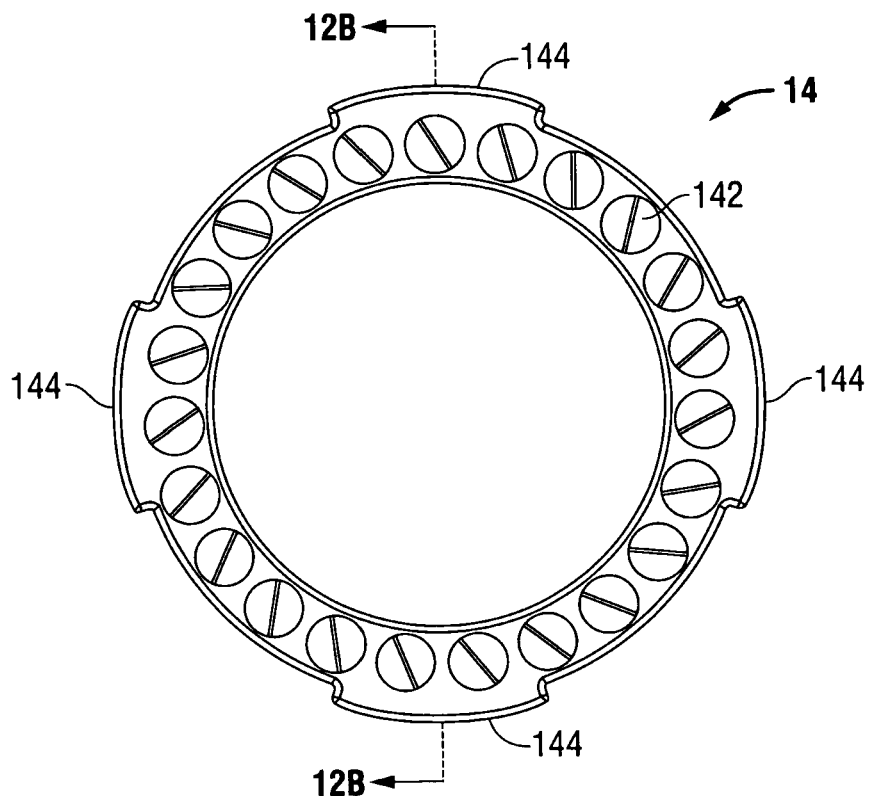
FIG. 12A depicts a front view of a stationary thrust bearing usable with the present system.
Figure 12B:
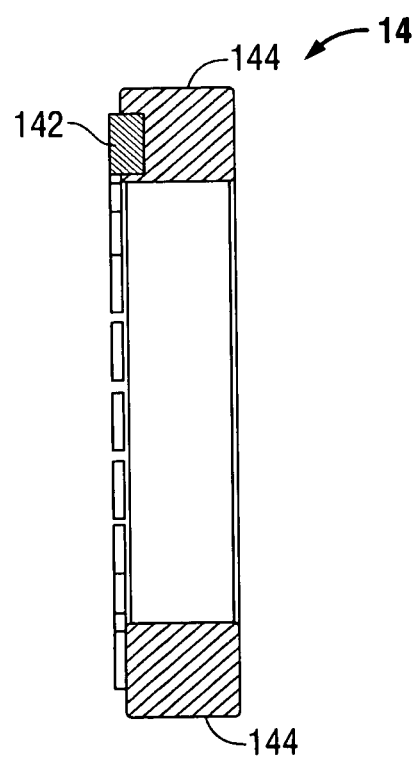
FIG. 12B depicts a cross-sectional view of the stationary thrust bearing of FIG. 12A along line 12B.

FIGS. 12A and 12B depict an embodiment of a stationary thrust bearing (14), which is shown as a generally ring-shaped structure having a width of about 1.00 inch, an outer diameter of about 5.400 inches, and an inner diameter of about 4.025 inches. Twenty-three round plates (142) are shown circumferentially spaced on a front side of the stationary thrust bearing (14), for abutting the plates of the respective adjacent rotating thrust bearing. The plates (142) can be embedded into the front surface of the stationary thrust bearing (14), extending from 0.160 to 0.215 inches into the front surface of the stationary thrust bearing (14). The plates (142) can protrude from 0.096 inches to 0.100 inches from the front surface of the stationary thrust bearing (14). The plates (142) can include diamond material, such as polycrystalline diamond compact, for preventing wear on the stationary thrust bearing (14) and on the adjacent rotating thrust bearing.

The stationary thrust bearing (14) is shown having four protrusions (144), each extending approximately 0.162 inches from the edge of the stationary thrust bearing (14). The protrusions can have a width equal to approximately 11.11% (40 degrees) of the circumference of the stationary thrust bearing (14). The protrusions (144) can engage with slots of adjacent objects along the tubular housing member (28) to facilitate maintenance of the stationary thrust bearing (14) in a stationary relationship with the tubular housing member (28). The stationary thrust bearing (14) is therefore retained in an axial position using adjacent groups of biasing members, and is prevented from rotation through engagement of the protrusions (144) within slots of adjacent spacers and/or retainers.

The preloading biasing members (18a, 18b, 18c) can be ring-shaped Belleville springs having a width of about 0.190 inches, an outer diameter of about 5.40 inches, and an inner diameter of about 4.10 inches. The high load biasing members (17a, 17b, 17c) can be ring-shaped Belleville springs having a width of about 0.385 inches, an outer diameter of about 5.400 inches, and an inner diameter of about 4.100 inches.

In an embodiment, from two to four biasing members can be included in each group of biasing members. Each stationary thrust bearing (14a, 14b, 14c) can be retained in an axial position using up to 6,000 pounds, or more, applied by adjacent groups of biasing members. The stationary thrust bearings (14a, 14b, 14c) can also be permitted to axially move within the bearing assembly, when axial forces within the assembly exceed that provided by the biasing members.

Figure 13A:
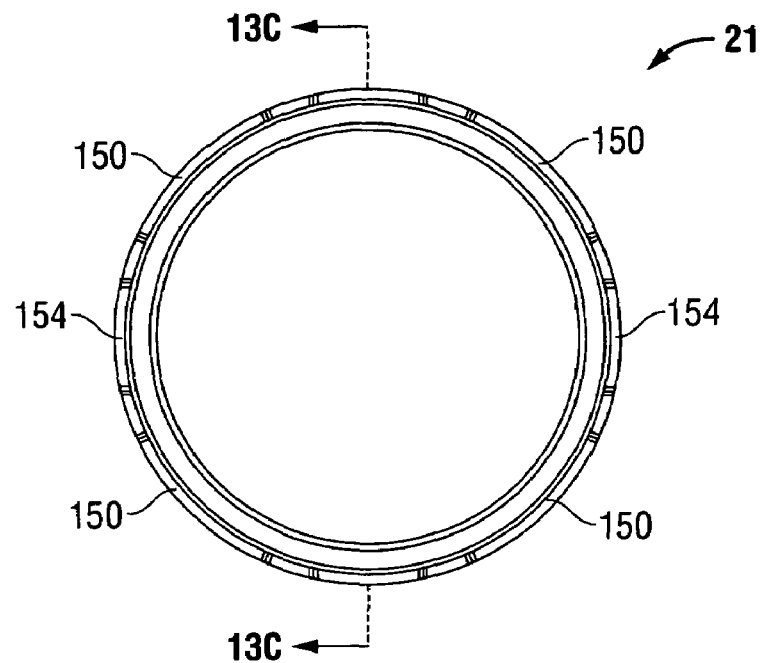
FIG. 13A depicts a front view of an embodiment of an upper retainer usable with the present system.
Figure 13B:
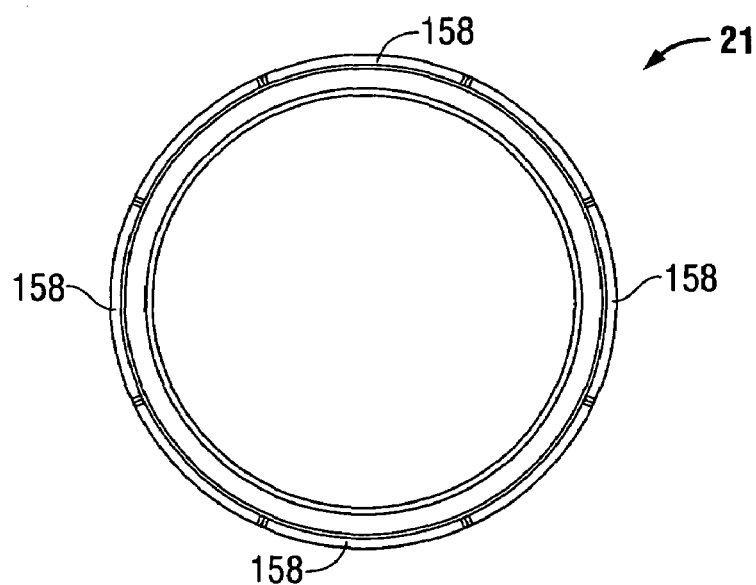
FIG. 13B depicts a back view of the upper retainer of FIG. 13A.
Figure 13C:
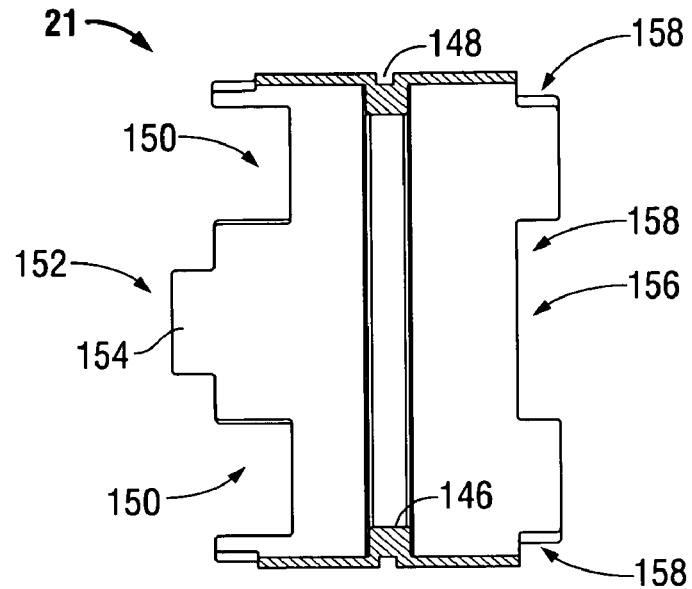
FIG. 13C depicts a cross-sectional view of the upper retainer of FIG. 13A along line 13C.

FIGS. 13A, 13B, and 13C depict an embodiment of the upper retainer (21), which is shown as a cylindrical structure having an overall length of about 4.500 inches, an outer diameter of about 5.735 inches, and an inner diameter of about 5.49 inches. The upper retainer (21) is depicted having a central interior ridge (146) having a height of about 0.345 inches and a width of about 0.49 inches. A groove (148) is shown formed in the exterior surface of the upper retainer (21) external to the central interior ridge (146) for accommodating one or more O-rings or similar sealing members. The groove can have a width ranging from 0.187 to 0.192 inches and a depth of about 0.105 inches.

The upper retainer (21) has a first side (152), which is shown having four front slots (150) equally spaced around the circumference of the upper retainer (21). Each front slot (150) is shown having a depth of about 0.90 inches and a width of approximately 11.39 percent (41 degrees) of the circumference of the upper retainer (21). The first side (152) is also shown having two protrusions (154) disposed on opposite sides of the first side (152), each having a length of about 0.500 inches and a width of about 1.240 inches.

The upper retainer (21) has a second side (156), which is shown having four rear slots (158) equally spaced around the circumference of the upper retainer (21). Each rear slot (158) is shown having a depth of about 0.500 inches and a width occupying approximately 13.9% (50 degrees) of the circumference of the upper retainer (21).

The front and rear slots (150, 158) are usable to engage with protruding portions of adjacent objects along the tubular housing member (28), such as the stationary thrust bearings (14a, 14b, 14c), to facilitate maintenance of the components in a stationary relationship with the tubular housing member (28). When the upper retainer (21) abuts against the adjacent lower retainer (19) and upper end stationary spacer (13a), the slots (150, 158) adjoin with slots in the adjacent objects to form closed slots within which lugs or ears of adjacent stationary thrust bearings are retained to prevent rotation of the stationary thrust bearings.

Figure 14A:
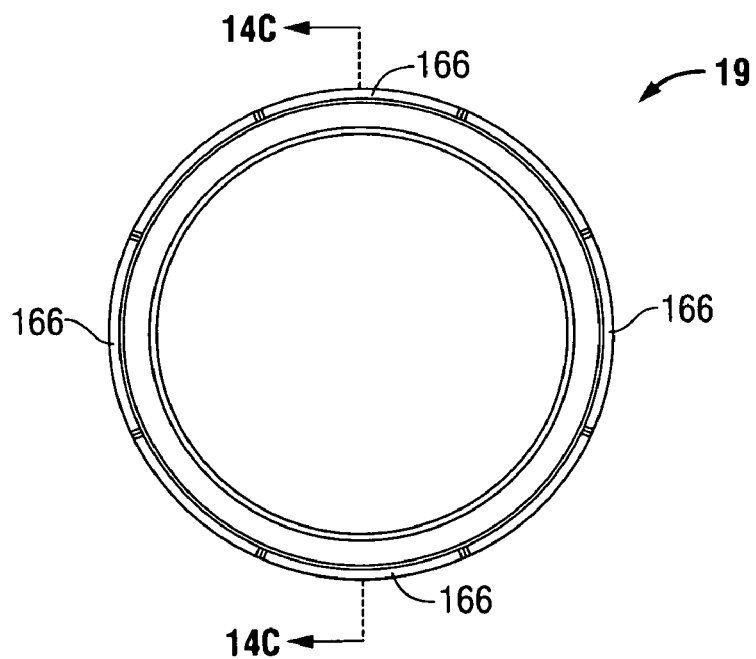
FIG. 14A depicts a front view of an embodiment of a lower retainer usable with the present system.
Figure 14B:
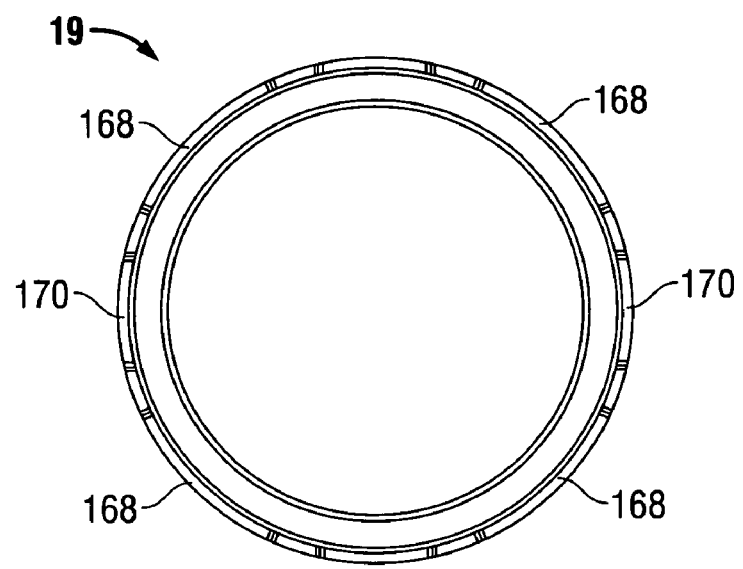
FIG. 14B depicts a back view of the lower retainer of FIG. 14A.
Figure 14C:
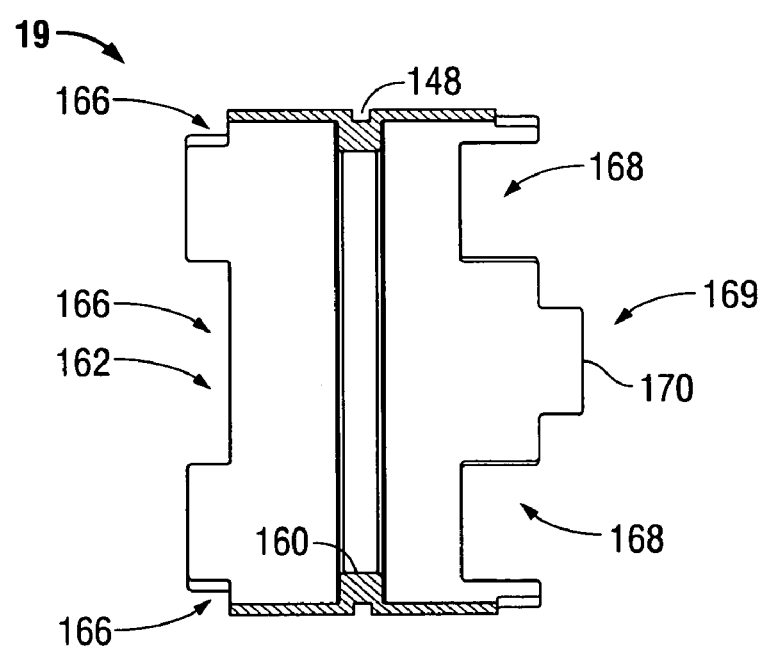
FIG. 14C depicts a cross-sectional view of the lower retainer of FIG. 14A along line 14C.

FIGS. 14A, 14B, and 14C depict an embodiment of the lower retainer (19), which can be a cylindrical structure having an overall length of about 5.320 inches, an outer diameter of about 5.735 inches, and an inner diameter of 5.49 inches.

The lower retainer (19) is shown having an interior central ridge (160) having a height of about 0.43 inches, and a width of about 0.49 inches. A groove (148) is shown formed in the exterior surface of the lower retainer (19) external to the interior central ridge (160) for accommodating one or more O-rings or similar sealing members. The groove can have a width ranging from 0.187 to 0.192 inches and a depth of about 0.105 inches.

The lower retainer (19) has a first side (162) and a second side (169). The first side (162) is shown having four front slots (166), which can have a length of about 0.500 inches and a width occupying about 13.9 percent (50 degrees) of the circumference of the lower retainer (19).

The second side (169) is shown having four rear slots (168), which can have a length of about 0.87 inches and a width occupying about 11.39 percent (41 degrees) of the circumference of the lower retainer (19). The second side (164) is also shown having two protrusions (170) having a length of about 0.500 inches and a width of about 1.240 inches.

As described previously, the slots (166, 168) of the lower retainer (19) can adjoin with slots in adjacent objects to form closed slots for retaining lugs or ears of adjacent stationary thrust bearings, thereby preventing rotation of the stationary thrust bearings.

FIG. 1 depicts a lower stationary radial bearing (11b) disposed adjacent the lower end stationary spacer (13b) along the interior surface of the tubular housing member (28). The lower stationary radial bearing (11b) can have a shape, components, and dimensions similar to those of the upper stationary radial bearing (11a) and/or the stationary radial bearing (11) depicted in FIGS. 10A and 10B, including spaces for accommodating one or more O-rings (12) and interior carbide inserts or bushings for preventing wear on the lower stationary radial bearing (11b) and the lower rotating bearing (9) disposed interior to the lower stationary radial bearing (11b).

A bottom stationary spacer (8) is shown disposed along the interior surface of the tubular housing member (28) adjacent to and abutting the lower stationary radial bearing (11b). In an embodiment, the bottom stationary spacer (8) can be a ring-shaped structure having a length of about 0.955 inches, an outer diameter of about 5.735 inches, and an inner diameter of about 5.25 inches.

Figure 15A:
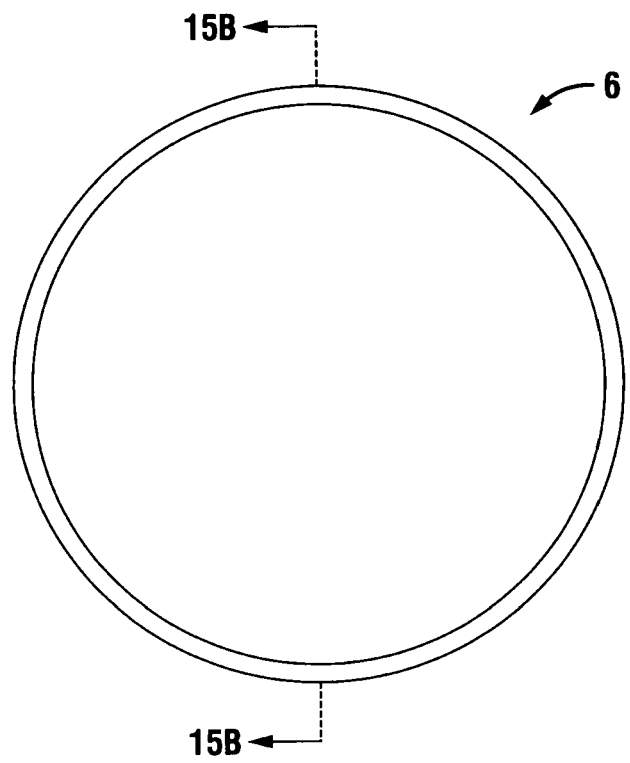
FIG. 15A depicts a front view of a lock nut spacer usable with the present system.
Figure 15B:
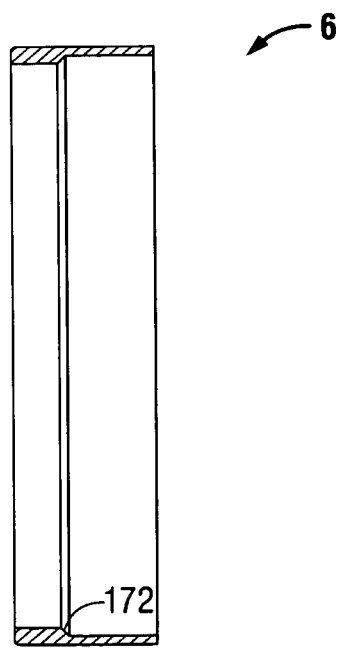
FIG. 15B depicts a cross-sectional view of the lock nut spacer of FIG. 15A along like 15B.

A lock nut spacer (6) is depicted adjacent to and abutting the bottom stationary spacer (8), between the tubular shaft (1) and a lock nut (3). FIGS. 15A and 15B depict an embodiment of the lock nut spacer (6), which is shown as a ring-like structure with a length of about 1.295 inches, and an outer diameter of about 5.400 inches. The lock nut spacer (6) is shown having an interior 45-degree shoulder (172), providing the lock nut spacer (6) with an inner diameter of about 5.10 inches at a first end and about 5.25 inches at an opposing end. The shoulder (172) can be formed approximately 0.80 inches from the opposing, wider end of the lock nut spacer (6).

A lock nut (3) is depicted threadably engaging the interior surface of the tubular housing member (28), adjacent to the bottom stationary spacer (8), and external of the lock nut spacer (6). A wave spring (5) and a split ring (4) are disposed between the lock nut (3) and the tubular shaft (1).

Figure 16A:
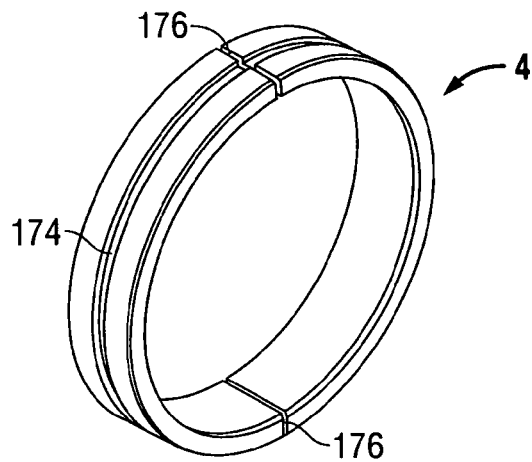
FIG. 16A depicts a split ring usable with the present system.
Figure 16B:
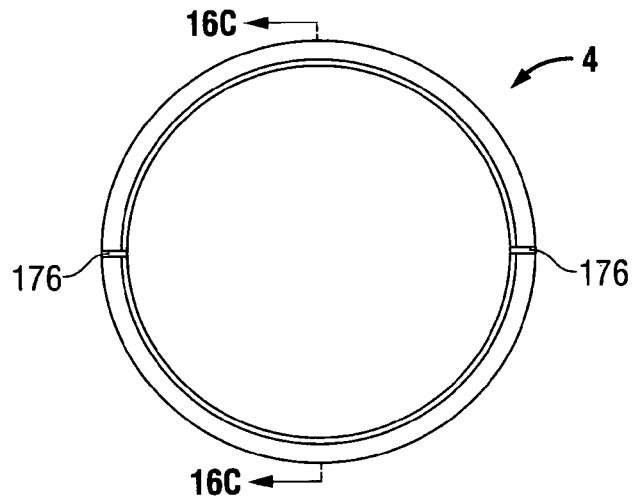
FIG. 16B depicts a front view of the split ring of FIG. 16A.
Figure 16C:
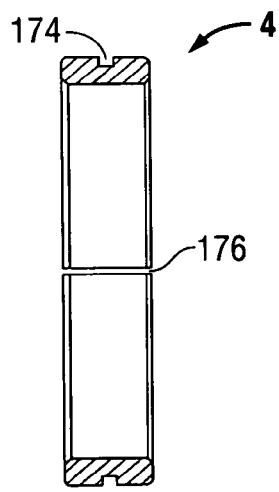
FIG. 16C depicts a cross-sectional view of the split ring of FIG. 16B along line 16C.

FIGS. 16A, 16B, and 16C depict an embodiment of a split ring (4), which is shown as a ring-shaped structure with an overall length of about 1.08 inches, an outer diameter of about 5.40 inches, and an inner diameter of about 4.75 inches. The split ring (4) can have a lateral exterior groove (174), having a width of about 0.19 inches and a depth of about 0.10 inches, which is usable to accommodate an O-ring or similar sealing member, and/or to provide compressability to the split ring (4). The split ring (4) can further have one or more axial cuts (176), having a width of about 0.06 inches, for facilitating placement and engagement with the tubular housing member (28) and adjacent components along the interior surface of the tubular housing member (28). Due to the axial cuts (176), the split ring (4) can include two pieces that can be placed around the tubular drive shaft (1) for proper positioning within the tubular housing member (28).

Figure 17A:
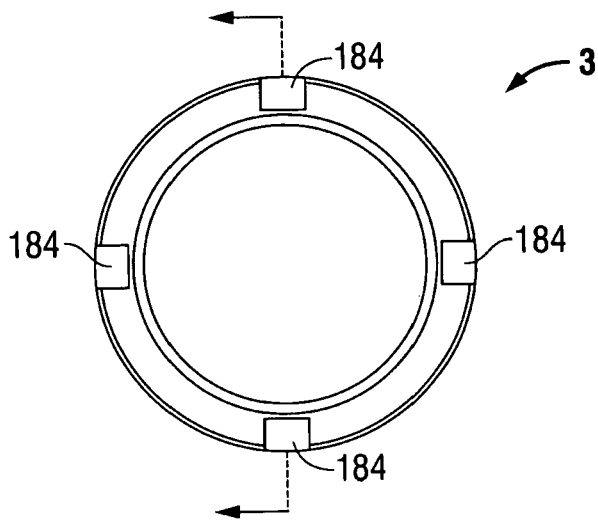
FIG. 17A depicts a front view of a lock nut usable with the present system.
Figure 17B:
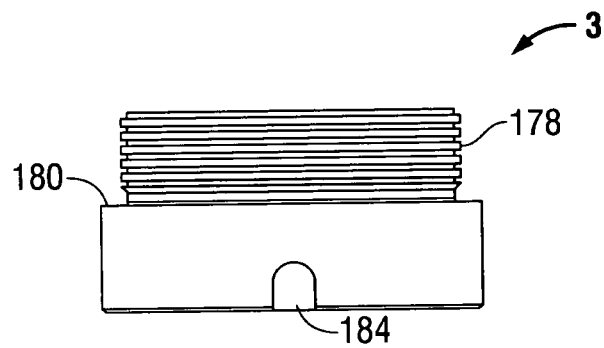
FIG. 17B depicts a side view of the lock nut of FIG. 17A.
Figure 17C:
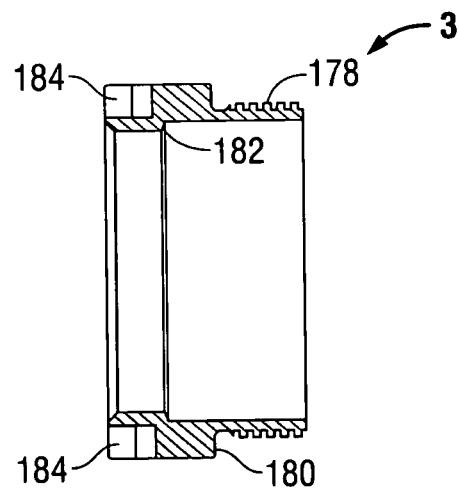
FIG. 17C depicts a cross-sectional view of the lock nut of FIG. 17A along line 17C.

FIGS. 17A, 17B, and 17C depict an embodiment of the lock nut (3), which is depicted as a round, threaded nut having a length of about 3.60 inches, which can include a threaded portion (178) having a length of about 1.625 inches and an outer diameter of about 5.79 inches. The lock nut (3) can include an exterior shoulder (180), having an outer diameter of about 6.75 inches, for facilitating abutment with and compression of adjacent objects, and for facilitating a flush fit with the exterior of the tubular housing member (28). The lock nut (3) can have an inner diameter of about 5.420 inches at its interior end, and an inner diameter of about 5.05 inches at the opposing end exterior to an internal shoulder (182).

The exterior end of the lock nut (3) can include multiple notches (184) for enabling torquing and removal of the lock nut (3). Each notch (184) is depicted having a U-shape, with a width of about 0.75 inches and a depth of about 0.88 inches.

When the lock nut (3) is tightened, the upper and lower stationary radial bearings (11a, 11b), bottom stationary spacer (8), upper and lower stationary end spacers (13a, 13b), upper and lower retainers (21, 19), stationary load spacer (26), and upper stationary spacer (27) are compressed into the housing shoulder (70). The applied axial load creates frictional forces between all of the components installed along the tubular housing member (28), which can be varied to exceed the maximum torque expected to be applied on the tubular housing member (28).

The abutment between the stationary end spacers (13a, 13b) and upper and lower retainers (21, 19) forms closed slots, which engage protrusions in the adjacent stationary thrust bearings (14a, 14b, 14c). The groups of biasing members (17a, 17b, 17c, 18a, 18b, 18c) bias an adjacent stationary thrust bearing against one of the rotating thrust bearings, axially securing the stationary thrust bearings, while engagement between the lugs or ears of the stationary thrust bearings with the slots in the end spacers and retainers prevents rotation of the stationary thrust bearings.

Each of the installed components along the tubular housing member (28) is thereby retained in a stationary orientation with respect to the tubular housing member (28) using solely the compression between the lock nut (3) and the housing shoulder (70), such that all of the components installed along the tubular housing member (28) remain stationary, concurrent with the tubular housing member (28) during drilling operations. Further, the components secured to the tubular housing member (28) are able to be engaged with the stationary thrust bearings (14a, 14b, 14c) to prevent rotation of the stationary thrust bearings (14a, 14b, 14c), while groups of biasing members (17a, 17b, 17c, 18a, 18b, 18c) apply a constant axial force to the stationary thrust bearings (14a, 14b, 14c).

The present system is thereby usable to install and secure certain components to the rotatable tubular drive shaft (1), and certain other components to the tubular housing member (28), such that all components secured to the tubular drive shaft (1) rotate concurrent with the tubular drive shaft (1) during drilling operations, while all components secured to the tubular housing member (28) remain stationary. Substantially all wear in the present system occurs between abutting faces of adjacent rotating thrust bearings and stationary thrust bearings, and along tungsten carbide inserts or bushings disposed between rotating radial bearings and stationary radial bearings, thereby minimizing repair costs and repair time.

While these embodiments have been described with emphasis on the embodiments, it should be understood that within the scope of the appended claims, the embodiments might be practiced other than as specifically described herein.

What is claimed is:

1. A system for preventing slippage and rotation of components installed in a tubular housing of a drill string during drilling operations, the system comprising:
    a tubular housing member in communication with a drill bit, the tubular housing member comprising an interior surface, a first end, a second end configured for attachment to a mud motor, and a shoulder proximate to the second end;
    an adjustable member secured to the tubular housing member proximate to the first end;
    at least one component installed in the tubular housing member between the shoulder and the adjustable member, wherein said at least one component covers a first portion of the interior surface while leaving a second portion of the interior surface uncovered; and
    at least one spacing member disposed between the shoulder and the adjustable member, wherein said at least one spacing member covers substantially all of the second portion of the interior surface, wherein the adjustable member is tightened such that the adjustable member and the shoulder apply a compressive axial load to said at least one component and said at least one spacing member, and wherein the compressive axial load creates frictional forces between said at least one component and said at least one spacing member greater than a maximum torque expected to act on the tubular housing member, such that said at least one component remains stationary with respect to the tubular housing member during drilling operations for enabling said at least one component to affect the orientation of the drill bit.

2. The system of claim 1, wherein said at least one component comprises a thrust bearing, a radial bearing, or combinations thereof.

3. The system of claim 1, further comprising at least one thrust bearing disposed between said at least one component, said at least one spacing member, or combinations thereof.

4. The system of claim 3, wherein said at least one thrust bearing comprises a lug engaging a slot in said at least one spacing member.

5. The system of claim 1, wherein the adjustable member comprises a nut.

6. The system of claim 1, wherein said at least one spacing member comprises a member of the group consisting of: a split ring, a spring, a spacer, a sealing member, a spring retainer, a washer, and combinations thereof.

7. The system of claim 6, wherein the spring comprises a wave spring, a belleville spring, or combinations thereof.

8. The system of claim 6, wherein the sealing member comprises at least one o-ring.

9. A method for preventing slippage and rotation of components installed in a tubular housing of a drill string during drilling operations, the method comprising the steps of:
    installing at least one component in a tubular housing member in communication with a drill bit, the tubular housing member comprising an interior surface, a first end, a second end configured for attachment to a mud motor, and a shoulder proximate to the second end, wherein said at least one component covers a first portion of the interior surface of the tubular housing member while leaving a second portion of the interior surface uncovered;

installing at least one spacing member in the tubular housing member, wherein said at least one spacing member covers substantially all of the second portion of the interior surface;

installing a torquable member in the tubular housing member proximate to the first end; and tightening the torquable member, thereby providing a compressive axial load on said at least one component and said at least one spacing member, wherein the compressive axial load creates frictional forces between said at least one component and said at least one spacing member greater than a maximum torque expected to act on the tubular housing member, such that said at least one component remains stationary with respect to the tubular housing member during drilling operations for enabling said at least one component to affect the orientation of the drill bit.

10. The method of claim 9, wherein said at least one component comprises a thrust bearing comprising a lug, and wherein the step of installing said at least one component comprises engaging the lug with a slot in said at least one spacing member.

11. A system for preventing slippage of rotating components installed on a rotatable tubular shaft of a drill string while enabling rotation of the rotating components concurrent with the rotatable tubular shaft, and for preventing slippage and rotation of stationary components installed in a tubular housing member external to the rotatable tubular shaft, the system comprising:

a tubular shaft comprising an exterior surface, an upper end configured for attachment to a mud motor, a lower end configured for attachment to a drill bit, and a shaft shoulder disposed proximate to the lower end, wherein the tubular shaft is adapted to rotate during drilling operations;

a first adjustable member secured to the tubular shaft proximate to the upper end;

at least one rotating component installed on the tubular shaft between the shaft shoulder and the first adjustable member, wherein said at least one rotating component covers a first portion of the exterior surface while leaving a second portion of the exterior surface uncovered;

at least one shaft spacing member disposed between the shaft shoulder and the first adjustable member, wherein said at least one shaft spacing member covers substantially all of the second portion of the exterior surface, and wherein the first adjustable member is tightened such that the first adjustable member and the shaft shoulder apply a compressive axial load to said at least one rotating component and said at least one shaft spacing member, wherein the compressive axial load creates frictional forces between said at least one rotating component and said at least one shaft spacing member greater than a maximum torque expected to act on the tubular shaft, such that said at least one rotating component remains stationary with respect to the tubular shaft during drilling operations, and such that said at least one rotating component rotates concurrent with the rotation of the tubular shaft during drilling operations;

a tubular housing member disposed over the tubular shaft, wherein the tubular housing member comprises an interior surface, a first end, a second end configured for attachment to the mud motor, and a housing shoulder proximate to the second end;

a second adjustable member secured to the tubular housing member proximate to the first end;

at least one stationary component installed in the tubular housing member between the housing shoulder and the second adjustable member, wherein said at least one stationary component covers a first interior portion of the interior surface while leaving a second interior portion of the interior surface uncovered; and at least one housing spacing member disposed between the housing shoulder and the second adjustable member, wherein said at least one housing spacing member covers substantially all of the second interior portion of the interior surface, wherein the second adjustable member is tightened such that the second adjustable member and the housing shoulder apply a compressive axial load to said at least one stationary component and said at least one housing spacing member, and wherein the compressive axial load creates frictional forces between said at least one stationary component and said at least one housing spacing member greater than a maximum torque expected to act on the tubular housing member, such that said at least one stationary component remains stationary with respect to the tubular housing member during drilling operations for enabling said at least one stationary component to affect the orientation of the drill bit, thereby enabling each of said at least one rotating component to rotate concurrent with the tubular shaft while retaining each of said at least one stationary component in a stationary position concurrent with the tubular housing member.

12. The system of claim 11, wherein said at least one stationary component, said at least one rotating component, or combinations thereof, comprises a thrust bearing, a radial bearing, or combinations thereof.

13. The system of claim 11, wherein said at least one rotating component comprises at least one rotating thrust bearing, the system further comprising at least one stationary thrust bearing.

14. The system of claim 13, wherein said at least one stationary thrust bearing comprises a lug engaging a slot in said at least one housing spacing member.

15. The system of claim 13, further comprising at least one biasing member disposed adjacent said at least one stationary thrust bearing, wherein said at least one biasing member biases said at least one stationary thrust bearing against said at least one rotating thrust bearing.

16. The system of claim 11, wherein the first adjustable member, the second adjustable member, or combinations thereof, comprises a nut.

17. The system of claim 11, wherein said at least one shaft spacing member, said at least one housing spacing member, or combinations thereof, comprises a member of the group consisting of: a split ring, a spring, a spacer, a sealing member, a spring retainer, a washer, and combinations thereof.

18. The system of claim 17, wherein the spring comprises a wave spring, a belleville spring, or combinations thereof.

19. The system of claim 17, wherein the sealing member comprises at least one o-ring.

20. The system of claim 11, wherein said at least one rotating component comprises a rotating radial bearing, and wherein said at least one stationary component comprises a stationary radial bearing disposed external to the rotating radial bearing.

21. The system of claim 20, further comprising at least one insert disposed between the stationary radial bearing and the rotating radial bearing for preventing wear on the bearings.

22. The system of claim 21, wherein said at least one insert comprises a plurality of inserts, wherein each insert of the plurality of inserts is interchangeable with each other insert of the plurality of inserts, and wherein each insert of the plurality of inserts is adapted for inverse installation to enable even wear on the insert.

23. A method for preventing slippage of rotating components installed on a rotatable tubular shaft of a drill string during drilling operations while enabling rotation of the rotating components concurrent with the rotatable tubular shaft, and for preventing slippage and rotation of stationary components installed in a tubular housing member external to the rotatable tubular shaft, the method comprising the steps of:

- installing at least one rotating component on a tubular shaft comprising an exterior surface, an upper end configured for attachment to a mud motor, a lower end configured for attachment to a drill bit, and a shaft shoulder disposed proximate to the lower end, wherein the tubular shaft is adapted to rotate during drilling operations, and wherein said at least one rotating component covers a first portion of the exterior surface of the tubular shaft while leaving a second portion of the exterior surface uncovered;
- installing at least one shaft spacing member on the tubular shaft, wherein said at least one shaft spacing member covers substantially all of the second portion of the exterior surface;
- installing a first torquable member on the tubular shaft proximate to the upper end;
- tightening the first torquable member, thereby providing a compressive axial load on said at least one rotating component and said at least one shaft spacing member, wherein the compressive axial load creates frictional forces between said at least one rotating component and said at least one shaft spacing member greater than a maximum torque expected to act on the tubular shaft, such that said at least one rotating component remains stationary with respect to the tubular shaft during drilling operations, and such that said at least one rotating component rotates concurrent with the rotation of the tubular shaft during drilling operations;
- installing a tubular housing member over the tubular shaft, wherein the tubular housing member comprises an interior surface, a first end, a second end configured for attachment to a mud motor, and a housing shoulder proximate to the second end;
- installing at least one stationary component in the tubular housing member, wherein said at least one component covers a first portion of the interior surface of the tubular housing member while leaving a second portion of the interior surface uncovered;
- installing at least one housing spacing member in the tubular housing member, wherein said at least one housing spacing member covers substantially all of the second portion of the interior surface;
- installing a second torquable member in the tubular housing member proximate to the first end; and
- tightening the second torquable member, thereby providing a compressive axial load on said at least one stationary component and said at least one housing spacing member, wherein the compressive axial load creates frictional forces between said at least one stationary component and said at least one housing spacing member greater than a maximum torque expected to act on the tubular housing member, such that said at least one stationary component remains stationary with respect to the tubular housing member during drilling operations for enabling said at least one stationary component to affect the orientation of the drill bit, thereby enabling each of said at least one rotating component to rotate concurrent with the tubular shaft while retaining each of said at least one stationary component in a stationary position concurrent with the tubular housing member.

24. The method of claim 23, wherein said at least one rotating component, said at least one stationary component, or combinations thereof, comprises a thrust bearing comprising a lug, and wherein the step of installing said at least one rotating component, the step of installing said at least one stationary component, or combinations thereof, comprises engaging the lug with a slot in an adjacent spacing member.

* * * * *